Aug. 27, 1929.                J. R. WOOD                1,725,840
                           MOLDING MACHINE
                         Filed May 18, 1926          7 Sheets-Sheet 3
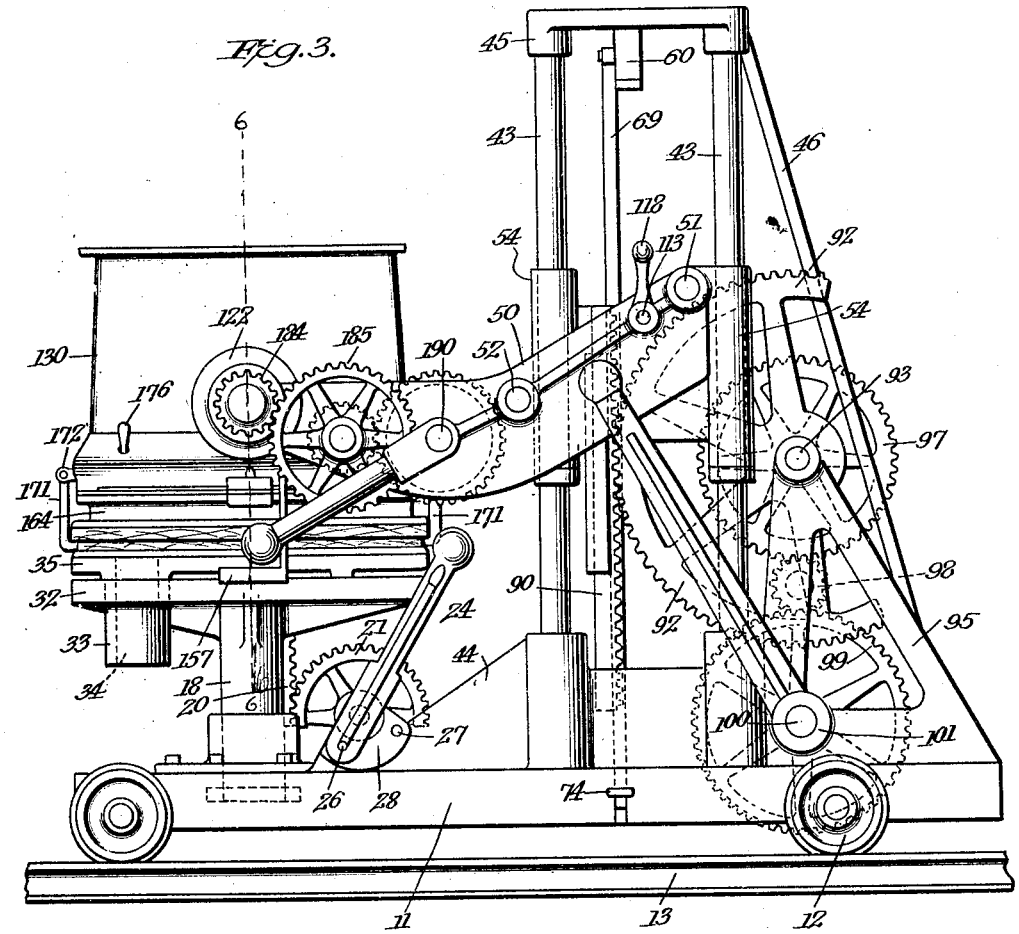
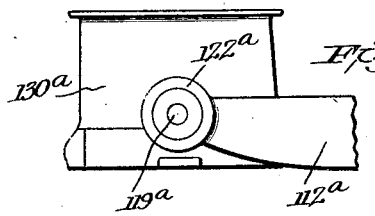
Inventor
John R. Wood
By Joseph W. Hazell
Attorney

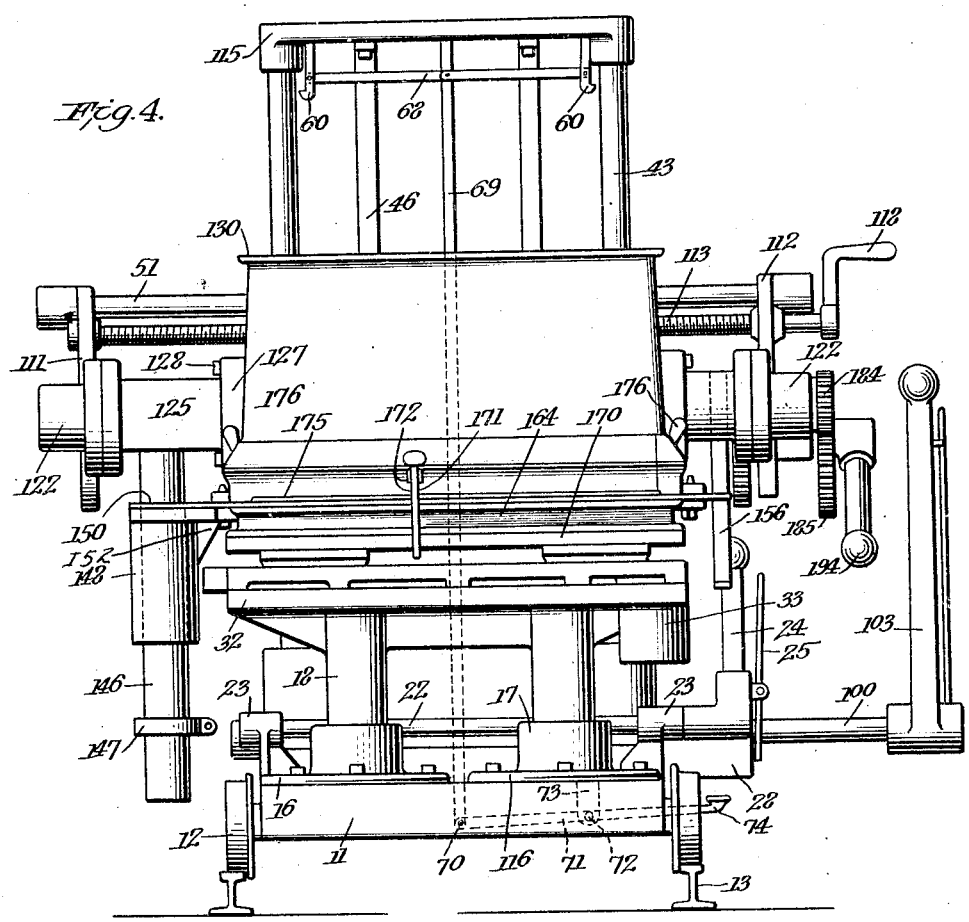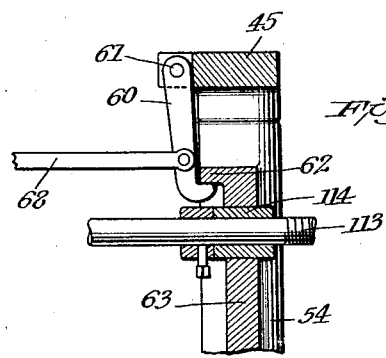

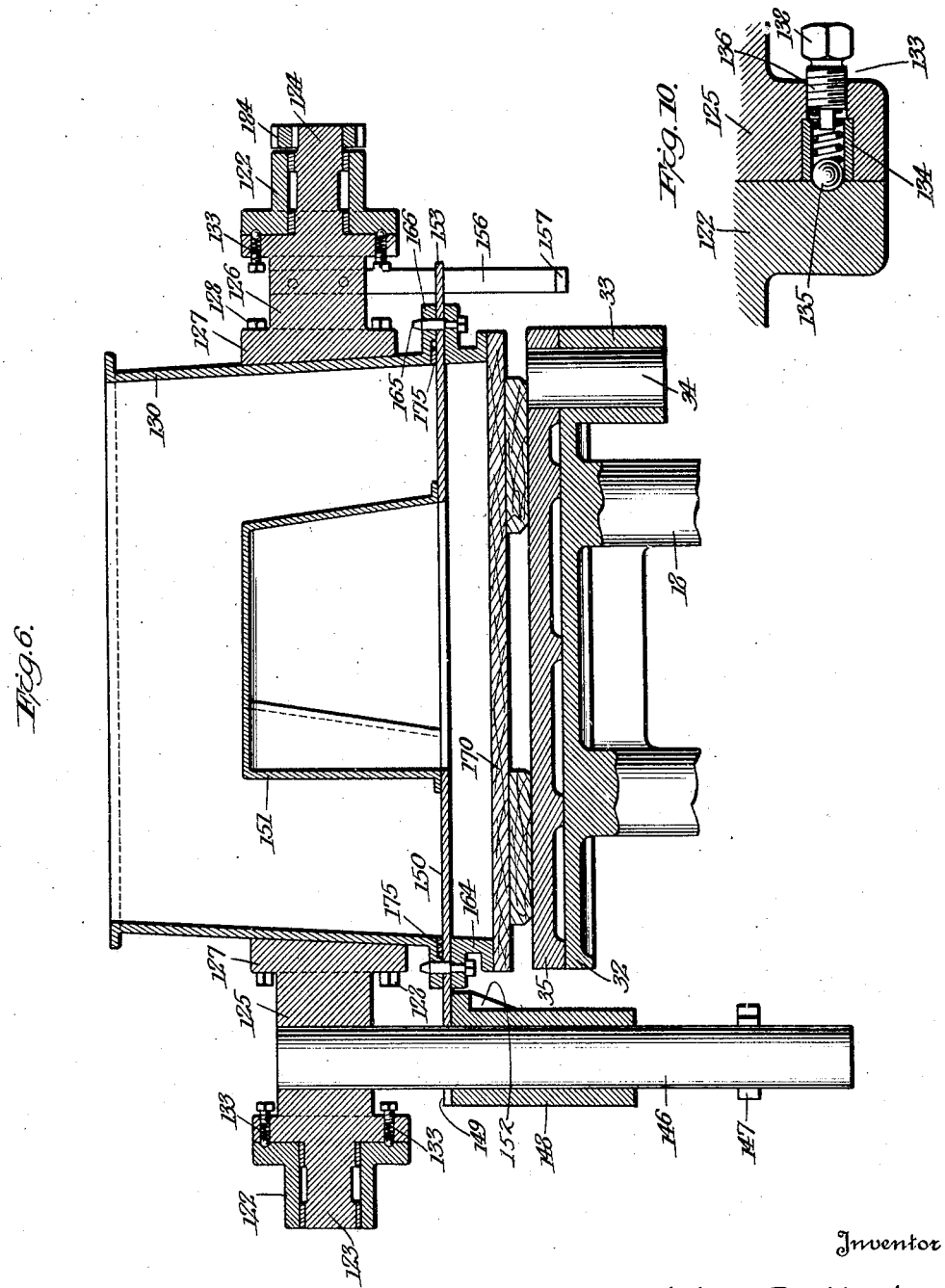

Aug. 27, 1929. J. R. WOOD 1,725,840
MOLDING MACHINE
Filed May 18, 1926 7 Sheets-Sheet 7

Inventor
John R. Wood
By Joseph W. Hazell
Attorney

Patented Aug. 27, 1929.

1,725,840

UNITED STATES PATENT OFFICE.

JOHN RICHARD WOOD, OF HATBORO, PENNSYLVANIA, ASSIGNOR TO NEW PROCESS MULTI-CASTINGS COMPANY, A CORPORATION OF NEW JERSEY.

MOLDING MACHINE.

Application filed May 18, 1926. Serial No. 109,943.

The present invention relates to molding machines, and more particularly to a portable, manually operable machine for making sand molds.

It is an object of the present invention to provide such a hand machine with a flask, or a part of a flask, attached thereto, thereby obviating the necessity of using a separate flask for each mold.

It is a further object of the invention to provide such a machine with a pattern plate attached, and with means for drawing the pattern in a vertical direction.

Another object is to provide a machine of the type described which is provided with adjustable flask attaching means, whereby a suitable flask may be selected for a particular job and attached to the machine, forming a part thereof until as many molds as may be required are made, after which this flask may be removed and another, of a different size, if required, may be substituted and incorporated into the machine, forming a part thereof, for the next job.

Still another object of the present invention is to provide a machine of the character set forth in which the pattern may be drawn, the mold parts assembled and the flask stripped from the mold in a straight vertical line, thereby enlarging the field of utility of the machine to include the making of molds of various vertical and horizontal dimensions, the drawing of the pattern plate and assembly of the mold parts being accomplished invariably without scraping the mold parts.

A still further object of the invention is to provide such a machine which includes flask roll-over mechanism, and a vertically movable operating table.

Other and further objects and advantages of the invention will appear from the following detailed description, taken in connection with the accompanying drawings, which illustrate, by way of example, a preferred embodiment thereof, but which are not to be taken as a definition of the invention, reference being had to the appended claims for that purpose.

Of the drawings:

Fig. 3 is likewise a side elevation, showing the parts of the machine in still another position, with the flask rolled over and the cope in position to make the cope mold;

Fig. 4 is an end elevation of the machine, showing the parts in the position of Fig. 3;

Fig. 6 is an enlarged sectional elevation of the flask parts and pattern plate, taken on line 6—6 of Fig. 3;

Fig. 7 is an enlarged detail view, partly in section, of one of the retaining hooks, for holding the flask frame in elevated position;

Fig. 10 is an enlarged sectional detail view of one form of the flask-positioning means;

Fig. 11 is a side elevation, on a reduced scale, and partly broken away, of another form of flask attaching means.

Referring in detail to the accompanying drawings, which illustrate, by way of example, a preferred embodiment of the present invention, there is shown a manually operable portable machine including a base 11 shown as being in the form of a truck mounted on wheels 12 running on tracks 13 to enable the machine to be moved conveniently to any part of the foundry, and, in some cases, also to enable the machine to be moved, if desired, while it is in operation, as may be desirable in some instances where the machine is to be used in connection with an endless mold-carrying conveyor. Where the machine is to be used in one place for making a series of molds, it may be provided with any suitable brake or brakes, or the wheels 12 may be blocked in any suitable manner to maintain the frame stationary. The readily portable form of the machine also enables it to be brought under an overhead gravity sand-delivering device or to be conveniently used in connection with any suitable or known form of sand slinger for projecting sand into the flask parts with sufficient force to pack it therein.

The machine of the present invention is preferably provided with a vertically movable operating table, and, in this connection, means are provided by the invention for raising and lowering the table and for swinging a mold-carrying table head in a horizontal plane either over and upon the table or away from the table to facilitate the removal of the completed and assembled mold therefrom.

Figure 1:
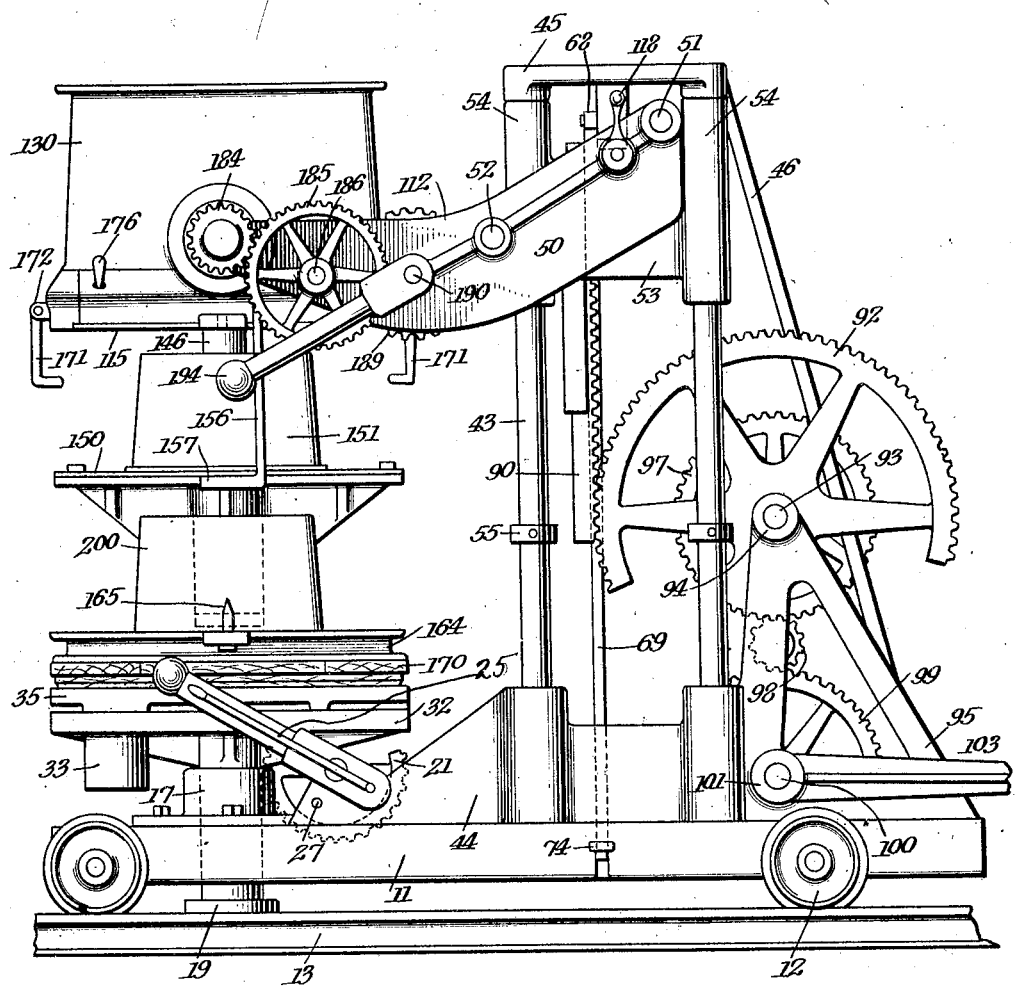
Fig. 1 is a side elevation of a preferred embodiment of the invention, showing the position of parts with the cope raised, the drag lowered, and the pattern drawn.

In the present embodiment of the invention, the means referred to is shown, by way of example, as including a pair of base portions 16 bolted or otherwise secured to the truck frame, each having projecting upwardly therefrom a guiding sleeve 17, which is preferably open at each end to receive therewithin a vertically extending cylindrical table standard 18, each of which may be provided at its lower end with an enlarged base portion 19, and each of which has suitably secured thereto, and extending vertically at one side thereof, a rack 20, with each of which the sleeve 17 being cut away where necessary, meshes a gear segment 21 fixed on a shaft 22 revolubly carried in horizontal bearings 23 secured to the base 11 at the side edges thereof. One end of the shaft 22 projects through its bearing and has fixed thereon an operating handle or lever 24, with which may be associated any suitable form of holding means for maintaining said handle 24 in any of a plurality of positions. The holding means herein illustrated (Figs. 1, 3 and 4) includes the auxiliary stop lever 25 pivotally secured on the lever 24 and carrying an inwardly extending pin 26, which is adapted to enter optionally one of a plurality of holes 27 provided in a stop locating plate 28 extending laterally from one of the bearings 23 and suitably secured to the base 11 of the machine.

Figure 9:
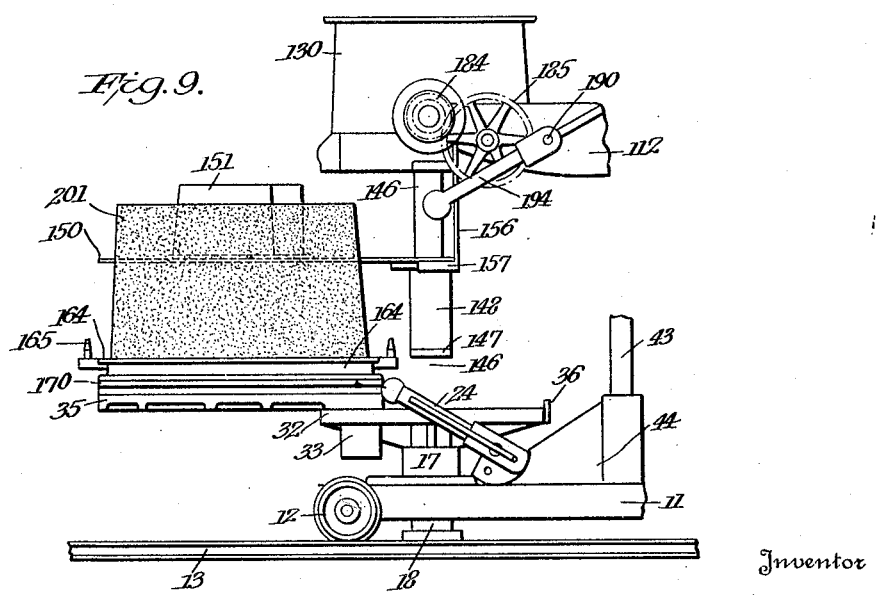
Fig. 9 is a side elevation, partly broken away, of the parts shown in Fig. 8.

The vertically extending standard 18 terminates at its upper end in the horizontal table top 32, which, at one corner thereof, is provided with a downwardly extending guiding sleeve 33, which rotatably receives the downwardly extending pivot 34 of a horizontal swinging table head 35, which is adapted either to rest on and be supported by the table top 32, as shown in Figs. 1 to 6 inclusive, or to be swung outwardly from said table top 32 in a horizontal plane about its vertical pivot, as shown in Fig. 9.

It will be obvious from the foregoing that the table head 35 may be raised or lowered by rotation of the shaft 22 through suitable movement of the lever 24 and that the table may be maintained in raised or lowered position by engagement of the pin 26 in either of the holes 27. A suitable stop lug 36 (see Fig. 9) may be provided on the table top 32 for accurately positioning the swinging head 35 thereon.

The present invention also includes means for securing a flask or a part of a flask to the machine and means for raising and lowering the flask in a straight vertical direction in order to facilitate the drawing of the pattern and the stripping of the mold. The invention also includes flask roll-over mechanism, pattern drawing means, and variably positionable flask-embracing mechanism for rotatably and removably securing a flask or a part thereof to the machine, the last-named mechanism being adjustable to revolubly embrace and removably secure to the machine flasks of different sizes which may be required on different molding jobs.

Accordingly, the present embodiment of the invention includes, by way of example and illustration of the foregoing means and mechanism, preferably a plurality of stationary, cylindrical, vertically extending guides 43, each of which has its lower end secured in a guiding bar supporting frame 44, which is fixed to the base 11 of the machine in any suitable manner. The upper ends of the guides 43 are secured one to each corner of a rectangular top guide bar bracing frame 45. To the rectangular frame 45 may be secured, in any suitable manner, the upper ends of a plurality of bracing struts 46, provided at their lower ends with feet 47, by which they may be bolted or otherwise suitably secured to the base 11 of the machine.

A flask frame 50 is vertically movable on the guides 43, and, for this purpose, is secured by a pair of horizontal shafts 51 and 52 to a rectangular elevating frame 53 provided at each of its four corners with sleeve portions 54, each of which slidably receives one of the guides 43.

An adjustable stop collar 55 is secured on each of the guides 43 below each sleeve 54 for the purpose of stopping and supporting the frame 53 in its lower position. The elevating frame 53 is maintained in its uppermost position by means of hooks 60 (see Fig. 7) pivotally mounted at 61 on and extending downwardly from the rectangular top guide bar bracing frame 45, and adapted to engage the short, horizontal, inwardly projecting portions 62 of the end walls 63 of the elevating frame 53. A pair of connecting rods 68 are pivotally secured to the upper end of a hook release bar 69 and have their other ends pivotally secured to the hooks 60, as shown particularly in Figs. 4 and 7. The hook release rod 69 extends vertically of the machine and is located, as shown, within the guides 43. The lower end of the hook release rod 69 is pivoted at 70 to one end of a foot lever 71 pivoted at 72 by lugs 73 to the underside of the base 11 and having the laterally extending treadle portion 74 projecting beyond the side of the machine as shown in Figs. 3 and 4. It will be evident from the foregoing description that the elevating frame 53, upon being raised, will, upon approaching its upper position, engage by its lugs 62 with the hooks 60, moving said hooks inwardly so that, when the lugs pass the hooks, through the weight of the hooks and the hook release rod 69, the hooks may engage beneath the lugs 62 and maintain the elevating frame 53 in its raised position until the hooks are released by downward pressure on the treadle 74, which moves the hook release rod upwardly and draws the hooks 60 inwardly toward each other by means of the connecting rods 68, thus releasing the frame 53. The elevating frame 53 is stopped and supported in its lower position by the adjustable collars 55, upon which the sleeve portions 54 of the elevating frame 53 may rest.

Figure 5:
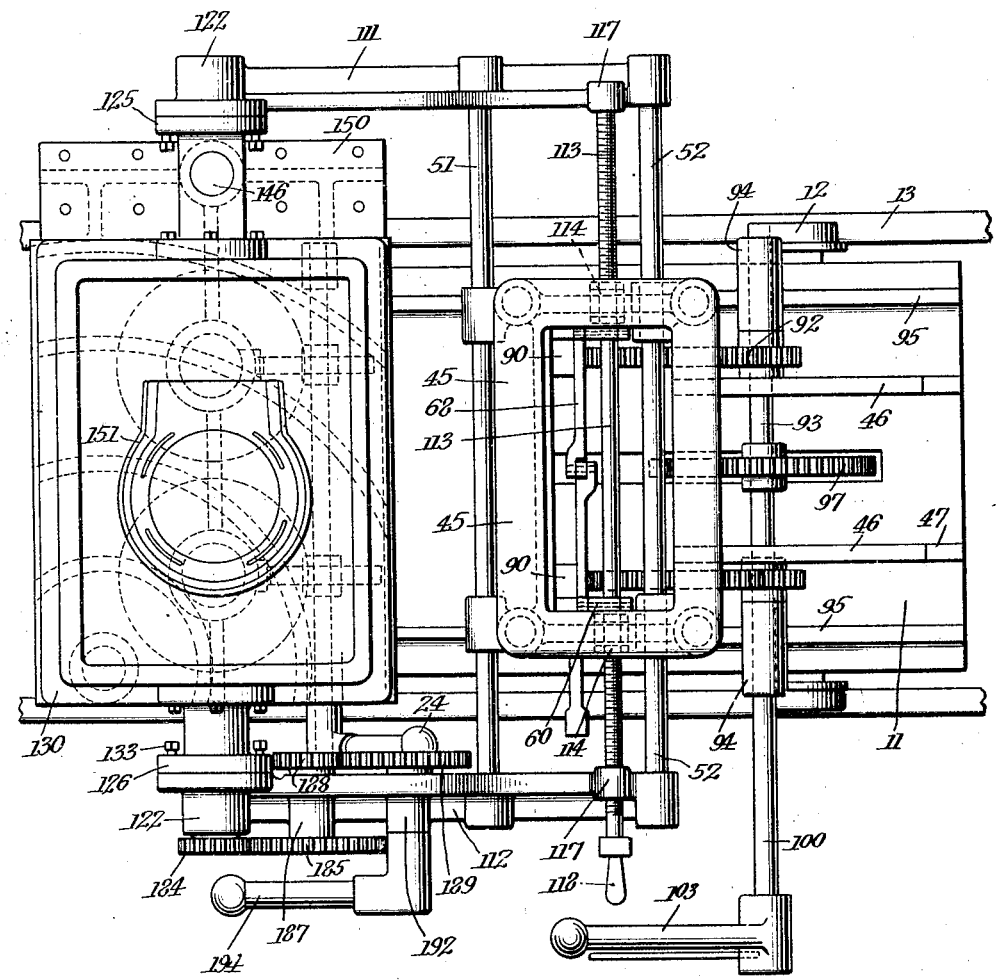
Fig. 5 is a top plan view of the machine, with the parts in the position of Fig. 3.

Referring now to the embodied form of mechanism for raising and lowering the elevating frame 53, a pair of vertically arranged racks 90 are affixed in any suitable manner to the raising and lowering frame 53 and extend downwardly therefrom, the teeth of each rack engaging with a gear segment 92. The gear segments 92 are keyed or otherwise non-rotatably secured to a horizontal shaft 93, whose ends are rotatably mounted in the upper shaft bearings 94 of vertically extending brackets 95 secured in any suitable manner to the base of the machine. Keyed or otherwise non-rotatably secured upon the shaft 93 is a gear 97, the teeth of which mesh with an intermediate idler gear 98 rotatably supported between the bearing frames 95 and in turn meshing with a driving gear 99 keyed upon the horizontally extending shaft 100 carried in lower bearings 101 formed in the bearing frame 95. The shaft 100 extends laterally from the machine as shown in Fig. 5, and has secured to its outer end an operating handle 103, which may be adjustably secured or keyed thereto for the purpose of enabling the shaft 100 to be rotated by the handle 103.

From the foregoing it is evident that movement of the handle 103 will rotate the shaft 100, and, through the gears 99, 98, 97 and 92, will lift the rack 90, which carries upwardly with it the frame 53, and this movement may be continued until the hooks 60 engage the top of the frame 53 and maintain it in its uppermost position. The lowering of the frame 53 may be accomplished by releasing the hooks 60 by means of the treadle 74 and moving the handle 103 back to its former position until the frame 53 rests in its lowermost position upon the adjustable stop collars 55.

Referring now to the flask frame 50 and the means for adjusting said frame to accommodate flasks of different sizes and the means for rolling over said flask, as shown in the present embodiment of the invention, the flask frame 50 includes two substantially horizontally extending flask-embracing arms 111 and 112, which are slidably carried upon the horizontal shafts 51 and 52 and are capable of being moved inwardly toward each other and outwardly away from each other. For this purpose, a horizontal adjusting shaft 113 is revolubly mounted in bearings 114 carried in the end walls of the frame 53, as shown in Figs. 5 and 7, and has its ends oppositely threaded for engagement with internal threads provided in the side walls of the flask-embracing arms 111 as shown at 117. The shaft 113 has one of its ends extending laterally beyond the arm 112 and has affixed thereto a crank handle 118 or other suitable means for rotating said shaft. It will thus be evident that the shaft 113 and flask-embracing arms 111 and 112 are raised and lowered with the frame 53 and that rotation of the shaft 113 by the handle 118 in one direction will cause the arms 111 and 112 to slide on the shafts 51 and 52 inwardly toward each other, and rotation of the shaft 113 in the opposite direction will cause the flask-embracing arms 111 and 112 to slide outwardly away from each other on said shafts 51 and 52. By the means just described, the flask-embracing arms 111 and 112 may be suitably adjusted to embrace flasks of different sizes, depending upon the particular kind and size of mold which the machine may be required to make.

The invention provides not only means for removably securing flasks of different sizes to the machine, but also provides means for securing the flasks rotatably to the machine and also provides roll-over mechanism associated therewith.

In the present embodiment of the invention each of the arms 111 and 112 is formed at its outer end with an enlarged bearing 122, as shown particularly in Fig. 6, and the bearings 122 may, if desired, be provided with any suitable form of bushings or bearing sleeves or ball or roller bearings, as may be desired, for revolubly securing therein the end portions 123 and 124 of flask-securing trunnions 125 and 126 respectively. Each of the trunnions 125 and 126 is shown as being provided at its inner end with an enlarged flask-contacting and securing portion 127, which may be provided with bolts 128 or other convenient means for securing a flask therebetween. In the present embodiment of the invention the cope part 130 of a flask is shown as being secured between the trunnions 125 and 126 by means of the bolts 128, and the cope 130 is thus revolubly mounted in the end bearings 122 of the flask-embracing arms 111 and 112. As shown particularly in Fig. 10, the trunnions 125 and 126 are provided with ball stop means 133, which are illustrated as consisting of a coil spring 134 pressing at one of its ends against a ball 135, a part of which enters a hemispherical depression formed in the bearing 122, and the other end of the spring 134 is engaged by the inner end of a screw bolt 136 threaded into the trunnion and having a head 138, by means of which it may be adjusted to vary the compression of the spring 134.

For the purpose of stopping and maintaining the cope 130 in its upright or its inverted position, each of the trunnions 125 and 126 is provided with two ball stops 133 located 180 degrees apart, and corresponding ball-receiving depressions are formed 180 degrees apart in the bearing portions 122.

In accordance with the present invention, a pattern plate is secured to the machine and is preferably arranged to be swung away from the table in a horizontal plane and also to be rotated with the cope part of the flask, and, in addition, means are provided for securing a straight vertical draw for the pattern plate.

Accordingly, one of the trunnions 125 is provided with a downwardly extending cylindrical rod or shaft 146, which may be fixed in said trunnion in any suitable manner. At the lower end of the shaft 146 an adjustable stop collar 147 is provided to be engaged by the lower end of a sleeve 148 revolubly and slidably mounted on the shaft 146 and having secured thereto at its upper end, in any suitable manner, and braced by the webs 152, the laterally extending portion 149 of a pattern plate 150 having thereon the pattern 151. On the other side of the pattern plate the laterally extending portion 153 thereof is adapted to be engaged at its edge by a downwardly extending pattern positioning and pattern drawing hook rod 156, which is fixed in or to the trunnion 126, as shown in Fig. 6, and extends downwardly therefrom parallel to the shaft 146 and has its lower end formed with a horizontal hook portion 157, as shown in Figs. 1, 3, 6 and 9, which may engage the underside of the laterally extending portion 153 of the pattern plate 150.

The present invention contemplates the making of a plurality of complete molds from a single flask attached to and forming a part of the machine, and, for this purpose, a drag member 164 is provided with guide pins 165, which are tapered at their upper ends and are adapted to engage slidably in corresponding openings formed in laterally projecting lugs 166 formed on the cope member 30 of the flask, for the purpose of guiding and centering the drag member with respect to the cope when the flask is assembled. The pattern plate 150 is likewise provided with openings similar to those formed in the lugs 166 of the cope, and which are engaged by the pins 165, which thus center the pattern plate within the flask. For the purpose of maintaining the drag mold in the flask during the rolling over of the flask, a bottom board 170 is provided and is adapted to be engaged under its edges by a plurality of hooks 171 pivotally mounted by lugs 172 formed on the cope 130, and these hooks 171 thereby secure the bottom board, drag and pattern plate rigidly to the cope member during the rollover operation.

For the purpose of maintaining the cope mold within the cope when the flask parts are separated and the pattern is being drawn, the cope is provided at its lower edge with sand-retaining slides 175, which are slidably mounted along the bottom edge of the cope and are arranged to be moved inwardly toward each other, projecting within the cope walls, or outwardly away from each other, clearing the inner face of the cope walls, by means of levers 176, which may be pivotally mounted intermediate their ends on the outer cope walls and have their lower ends projecting into slots formed in the sand-retaining slides 175 for the purpose of moving said slides inwardly and outwardly with respect to the cope 130.

From the foregoing it will be seen that when the hooks 171 are engaged beneath the bottom board 170, the cope member 130, upon being rotated, will carry with it the pattern plate, the drag member and the bottom board; or, upon being raised or lowered in a vertical direction, will likewise carry with it the pattern plate, drag member and bottom board. It will further be evident that when the hooks 171 are not engaged beneath the bottom board 170 and the parts are in upright position, as shown in Fig. 6, any upward movement of the cope 130 will leave the pattern plate, drag member and bottom board resting on the swinging table head 35, and that if the upward movement of the cope be continued, the adjustable collar 147 will contact with the lower end of the sleeve 148 and at the same time the horizontal hook portion 157 will engage beneath the laterally extending portion 153 of the pattern plate and thereafter if the cope continues to move upwardly, the pattern plate 150 will be carried upwardly with it, but spaced downwardly therefrom by the vertical distance between the pattern plate 153 and the hook 157 as they appear in Fig. 6, or, what is the same thing, by the distance measured from the lower end of the sleeve 148 to the upper surface of the collar 147, as these parts appear in Fig. 6. Obviously, a similar result would be secured by maintaining the cope stationary and with the hooks 171 released from the bottom board, lowering the table, thus carrying downwardly the bottom board, drag member and pattern plate until the pattern plate is engaged by the pattern plate stops 147 and 157. In most cases, however, the pattern plate will be lifted off the drag by raising the cope instead of lowering the table.

After the pattern plate begins to move upwardly with the cope, the drag and bottom board still remain on the swinging head 35, thus being separated from the pattern plate; and if the table 32 then be lowered, the drag and bottom board will be lowered with it, thus still further separating the drag from the pattern plate. A reversal of the movements hereinabove described will obviously serve to assemble the parts. It is also to be noted that when the parts are separated the pattern plate 150 may be swung about its pivot 146 away from its position over the table, thereby leaving a clear space between the cope and drag members, and the mold may then be closed by lowering the cope member and elevating the table carrying the drag member.

The roll-over mechanism herein illustrated includes a gear 184 keyed or otherwise non-rotatably secured to the projecting end of a trunnion 126, the teeth of gear 184 meshing with an idler gear 185 fixed on a short shaft 186 carried in a bearing 187 formed in the arm 112 and projecting inwardly thereof, the inwardly projecting end having fixed thereto a second gear 188, whose teeth mesh with a driving gear 189 fixed on a short shaft 190 rotatably carried in a bearing 192 formed in the side arm 112 and projecting outwardly therefrom. To the outwardly projecting end of the shaft 190 is affixed a handle 194 for the purpose of rotating the shaft 190, and, through the gears 189, 188, 185 and 184, rotating trunnion 126 for the purpose of rolling over the flask.

In Fig. 11 is shown another form of flask roll-over mounting, in which the enlarged portion 122ª of the flask 130ª is journaled at each end by a shaft 119ª in the flask embracing arms, one of which is shown at 112ª. This construction is substantially the same as that shown in the other figures, except that the flask roll-over gearing has been omitted.

It will also be obvious that other gearing, or other means, including power actuated means, may be substituted for the flask raising and lowering gearing and table lifting and lowering gearing herein shown without departing from the invention.

Figure 2:
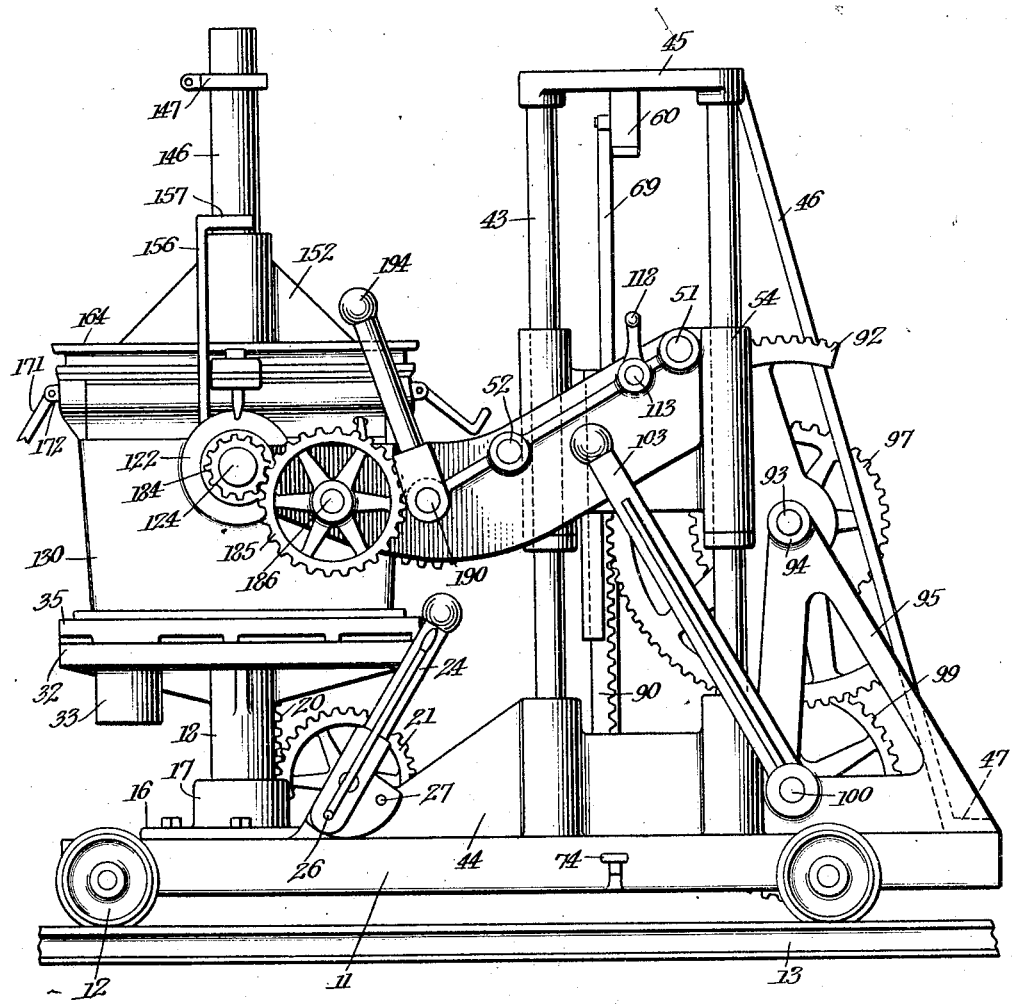
Fig. 2 is also a side elevation, showing the cope, drag and pattern plate assembled in initial position for making the drag mold.

The operation of the machine for the purpose of making a mold is as follows:

Assuming the parts of the machine to be in the position of Fig. 2, with the table 32 raised and the cope frame 50 lowered, the flask being rolled over to inverted position, with the drag member assembled on the cope and the inverted pattern plate 150 being located within the flask between the cope and drag, molding sand is introduced into the open bottom of the drag member either by a shovel, a sand slinger, or any other suitable form of sand-delivering means, to form the drag portion of the mold, the sand being hand rammed or packed in any suitable manner and the surplus sand being struck off even with the drag edges. The bottom board 170 is then placed upon the drag and engaged therewith by means of the bottom board hooks 171. Thereupon the lever 103 is moved to the right, as viewed in Fig. 2, thereby raising the frame 50 through the gears 99, 98, 97 and 92 and the rack 90. The frame 50 carries upwardly with it the flask-embracing arms 111 and 112, which, as described, are outwardly and inwardly slidably mounted on the frame 53 by the shafts 51 and 52. Once the flask is secured within the arms, however, the arms being adjusted inwardly or outwardly, as may be required, by rotating the crank handle 118, thus causing the shaft 113 to rotate in its bearings 114, and the right and left screw threads on the shaft 113 causing the arms 111 and 112 to move to the desired position, the flask-embracing arms are thereafter held stationary with respect to the shafts 50 and 51. The frame 53 continues its upward movement until the hooks 60 engage it as shown in Fig. 7, and maintain it in its uppermost position. Thereupon the table 32 may be lowered by means of the lever 24, the pin 26 being disengaged for this purpose, thus permitting the standard 18 to be lowered, the rack 20 engaging the teeth of the gear segment 21 and rotating the gear segment to the position shown in Fig. 1, the cutaway portion of the gear segment 21 permitting the table to be lowered to its lowermost position. The table being lowered, if necessary, for clearance purposes, other flask is then rolled over by the handle 194, which, through the gears 189, 188, 185 and 184, cause the trunnion 126 to rotate, the ball stops 133 riding out of the depressions in the bearing members 122 and engaging therewith in opposite positions when the cope has been rotated through 180 degrees.

After the flask has been rolled over, the table is raised and the flask is lowered to bring the parts to the position shown in Fig. 3. The cope member is then filled with sand and rammed in any suitable manner, the sand-retaining slides 175 having been moved inwardly for the purpose of retaining the cope mold in the cope when the cope is raised to draw the pattern.

Figure 8:
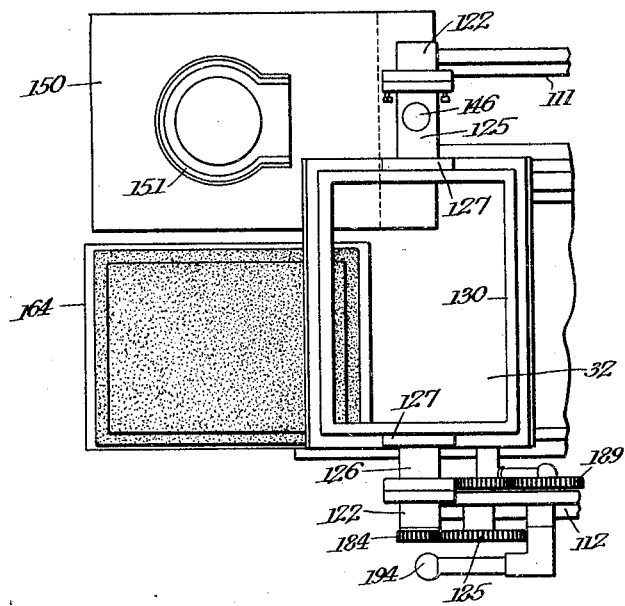
Fig. 8 is a plan view, on a reduced scale, and partly broken away, showing the pattern drawn and the assembled mold being removed from the machine.

In drawing the pattern, the bottom board hooks 171 are released from engagement with the bottom board and the cope is raised, as hereinbefore described, until it is engaged by the hooks 60, which hold it in uppermost position. After the cope begins to move upwardly, the pattern plate, drag and bottom board remain on the table until the pattern drawing stops 147 and 157 engage the pattern, thus lifting it partly off the drag mold. The table is then lowered by the means before described, and the parts will then occupy the position illustrated in Fig. 1, with the cope and drag separated their greatest distance, with the pattern plate clear of the drag mold 200, and the cope mold 201 within the cope. The pattern plate 150 may then be swung horizontally about its pivot 146 to the position shown in Fig. 8. The mold is now closed by raising the table and lowering the cope until the mold parts are brought together, after which the sand-retaining slides 175 are released or moved outwardly by levers 176. The cope is again raised, but since the sand-retaining slides no longer retain the cope mold within the cope, the cope mold will remain assembled on the drag mold as shown in Fig. 9. The swinging table head 35 is then moved arcuately in a horizontal plane about its pivot 34, as shown in Fig. 9, and the bottom board supporting the assembled mold may be removed from the table top and the drag 164 may be lifted off the mold. Any cores that are necessary or required may be set after the pattern plate has been swung aside and before closing the mold. The sprue hole may be formed at any convenient time during the making of the mold and in any convenient manner. After the mold is removed from the machine on the bottom board, a pouring jacket may be slipped over the mold while the casting is poured, the cope and drag members meanwhile being used on the machine for the making of further molds.

In cases where flasks of different sizes are to be used with the machine, the bolts 128 are removed from the enlarged flask-engaging portions 127 of the trunnions 125 and 126, the cope 130 is removed and the flask-embracing arms 111 and 112 are moved inwardly or outwardly on the horizontal shafts 51 and 52 by rotation of the shaft 113 by means of the handle 118, the required distance apart, when a new flask of different size may be inserted between the arms and may be secured thereto by the bolts 128.

It will be obvious from the foregoing description that the present invention provides a manually operable molding machine which uses a single flask for the production of as many molds as may be required; the machine has its pattern plate attached thereto and is provided not only with means for drawing the pattern, but with means for drawing the pattern in a straight vertical direction, thus insuring that the mold parts will not be scraped or injured either in drawing the pattern or in stripping or assembling the mold. It is also obvious that a flask of required size may be selected for a particular job and may be incorporated into the machine, forming a part thereof until as many molds have been made as may be required.

It will also be seen that the machine provides a vertically movable operating table which is manually operable and also a swinging head thereon movable in a horizontal plane for facilitating the removal of the closed mold from the machine. Stop 36 (Fig. 9) insures the accurate positioning of the swinging head upon the table top 32, and the vertical portion 156 of the pattern stripping hook insures the accurate positioning of the pattern plate within the flask. The accurate positioning of all the parts is further augmented by the tapered pins 165. By the mechanism described, absolutely accurate castings may be made and with a minimum of equipment. The machine, in addition to the foregoing, also provides manually operable roll-over mechanism with positioning means 133 insuring the accurate placing of the flask either in upright or inverted position.

What is claimed is:

1. A molding machine including, in combination, a flask, means rotatably securing said flask to said machine, a pattern plate pivotally mounted thereon, and manually operable vertically movable means for drawing said pattern plate.

2. A molding machine including, in combination, a flask, vertically movable flask-embracing means removably and rotatably securing said flask to said machine, and means for causing said flask embracing means to travel rectilinearly.

3. A molding machine including, in combination, a flask, vertically movable flask-embracing means removably and rotatably securing said flask to said machine, and means for variably positioning said flask-embracing means to accommodate flasks of different sizes.

4. A molding machine including, in combination, a flask, vertically movable means rotatably securing said flask to said machine, a horizontally swingable table top vertically movable on said machine, a horizontally swingable pattern plate secured to said machine and rotatable with said flask, and vertically movable means for drawing the pattern.

5. In a molding machine, a flask, a pair of arms rectilinearly movable in a vertical direction and rotatably carrying said flask, and means for varying the distance between said arms.

In testimony whereof I affix my signature.

JOHN RICHARD WOOD.